UNITED STATES PATENT OFFICE.

EUGÈNE DEPETRO, OF PARIS, FRANCE.

METHOD OF RETTING RAMIE OR SIMILAR FIBER.

SPECIFICATION forming part of Letters Patent No. 707,907, dated August 26, 1902.

Application filed May 26, 1902. Serial No. 109,094. (No specimens.)

*To all whom it may concern:*

Be it known that I, EUGÈNE DEPETRO, a citizen of the French Republic, residing at Paris, France, (whose post-office address is 65 Rue du Château d'Eau,) have invented certain new and useful Improvements in Methods of Retting Ramie or Similar Fiber, of which the following is a specification.

My invention relates to a process for removing from the fibers of ramie incrusting matters, such as gums and the like, this process consisting in utilizing the composition and properties of sea-water as the liquid for causing the fermentation required to free the fibers of all foreign matter.

This process has for its object the use of a liquid which in no wise injures the quality of the fibers, while at the same time it permits of incrusting substances being disaggregated and dissolved. The alkaline nature of the salts contained in more or less concentrated sea-water exercises a beneficial action for the preservation of the silky properties of the fibers, as will be explained hereinafter.

The substance to be treated—such as ramie, aloes, wood, and the like—is dipped into a solution containing the following salts in the approximate proportions given below: sodium chlorid, twenty-five grams; potassium chlorid, .700 grams; magnesium chlorid, three to six grams; magnesium sulfate, six to seven grams. Traces of alkali iodids and bromids may be added thereto. The above-mentioned proportions correspond to those of the salts contained in one liter of normal sea-water, but the relative ratio between the salts remaining the same the concentration of the solution may be varied. At the end of four or five days and at a temperature of 30° centigrade fermentation takes place within the mass, and at the end of eight or ten days' fermentation the gum is completely removed and the operation completed. It only remains to remove the fibers, which are then entirely freed of the incrusting matters that have been dissolved by the saline solution. By the action of this saline solution the foreign matters of the fibers are not only disaggregated, but also dissolved, while the alkaline nature of the solution preserves the qualities of the fibers.

I do not restrict myself to the proportions of salts hereinbefore stated nor to the degree of concentration of the liquid, which must contain in solution the aforesaid salts and which are those mainly contained in sea-water. I could, therefore, with a variable degree of concentration use either ordinary sea-water or an aqueous solution containing the aforesaid salts in the same, or about the same, proportions as they exist in sea-water.

Having now particularly described and ascertained the nature of my invention and in what manner it may be performed, I declare what I claim is—

The process for removing from the fibers of ramie, aloes, wood and the like incrusting matters such as gums and the like, which consists of treating these bodies with natural sea-water or with a solution of salts prepared so as to have nearly the composition of the sea-water, substantially as described.

In testimony whereof I have hereunto set my hand in presence of two subscribing witnesses.

EUGÈNE DEPETRO.

Witnesses:
EDWARD P. MACLEAN,
EMILE KLOTZ.